US010817911B2

(12) United States Patent
Delayen et al.

(10) Patent No.: US 10,817,911 B2
(45) Date of Patent: Oct. 27, 2020

(54) PROGRAMMATIC GENERATION OF GRAPHICAL DISPLAY SOURCE CODE FOR A COMPUTERIZED GRAPHICAL ADVERTISEMENT DISPLAY

(71) Applicant: CRITEO SA, Paris (FR)

(72) Inventors: Thomas Delayen, Chaville (FR); Clement Creteur, Paris (FR); Thomas Bernal, La Celle Saint Cloud (FR)

(73) Assignee: CRITEO SA, Paris (FR)

( * ) Notice: Subject to any disclaimer, the term of this patent is extended or adjusted under 35 U.S.C. 154(b) by 460 days.

(21) Appl. No.: 15/283,050

(22) Filed: Sep. 30, 2016

(65) Prior Publication Data

US 2018/0096399 A1    Apr. 5, 2018

(51) Int. Cl.
*G06F 17/00* (2019.01)
*G06Q 30/02* (2012.01)
*G06F 40/14* (2020.01)
*G06F 40/106* (2020.01)

(52) U.S. Cl.
CPC ....... *G06Q 30/0276* (2013.01); *G06F 40/106* (2020.01); *G06F 40/14* (2020.01); *G06Q 30/0241* (2013.01)

(58) Field of Classification Search
CPC .. G06Q 30/276; G06Q 30/277; G06F 17/212; G06F 17/2247; G06F 17/248; G06F 8/30; G06F 40/106; G06F 40/14; G06F 40/186
See application file for complete search history.

(56) References Cited

U.S. PATENT DOCUMENTS

| 9,691,086 | B1 * | 6/2017 | Deodhar | G06F 17/21 |
| 9,953,009 | B1 * | 4/2018 | Behar | G06F 17/212 |
| 2004/0194028 | A1 * | 9/2004 | O'Brien | G06F 17/211 |
| | | | | 715/247 |
| 2005/0055635 | A1 * | 3/2005 | Bargeron | G06F 17/211 |
| | | | | 715/251 |

(Continued)

OTHER PUBLICATIONS

European Search Report from corresponding European Patent Application No. 17193984.6, dated Mar. 2, 2018, 8 pages.

*Primary Examiner* — Cesar B Paula
*Assistant Examiner* — James H. Blackwell
(74) *Attorney, Agent, or Firm* — Proskauer Rose LLP

(57) ABSTRACT

A computer receives a request for graphical display source code for a computerized graphical advertisement display. The computer retrieves one or more seed layout descriptions, each seed layout description specifying associated constrained layout characteristics, and generates candidate layout descriptions based on at least the seed layout descriptions, each candidate layout description specifying associated constrained layout characteristics, where one or more of the candidate layout descriptions are generated by the computer altering one or more associated constrained layout characteristics of a seed layout description. The computer generates layout scores, each layout score associated with a candidate layout description. The computer selects a selected layout description from the candidate layout descriptions based on the layout scores. The computer generates the graphical display source code based on the selected layout description, a size of the computerized graphical advertisement display, and display capabilities of a user device.

36 Claims, 5 Drawing Sheets

(56) References Cited

U.S. PATENT DOCUMENTS

| | | | | |
|---|---|---|---|---|
| 2005/0071783 A1* | 3/2005 | Atkins | ............... | G06F 17/509 |
| | | | | 715/851 |
| 2007/0079236 A1* | 4/2007 | Schrier | ............... | G06F 17/217 |
| | | | | 715/206 |
| 2007/0253028 A1* | 11/2007 | Widdowson | ............ | G06T 11/60 |
| | | | | 358/1.18 |
| 2010/0169311 A1* | 7/2010 | Tengli | ................. | G06F 16/951 |
| | | | | 707/736 |
| 2013/0014008 A1* | 1/2013 | Damera-Venkata | ...................... | |
| | | | | G06F 17/212 |
| | | | | 715/252 |
| 2013/0024757 A1* | 1/2013 | Doll | ..................... | G06F 17/212 |
| | | | | 715/204 |
| 2014/0009495 A1* | 1/2014 | Sakai | ..................... | G06T 11/60 |
| | | | | 345/634 |
| 2015/0007064 A1* | 1/2015 | Givoni | ................ | G06F 16/958 |
| | | | | 715/760 |
| 2015/0019958 A1* | 1/2015 | Ying | .................... | G06F 17/211 |
| | | | | 715/243 |
| 2015/0088703 A1* | 3/2015 | Yan | ........................ | G06F 3/147 |
| | | | | 705/28 |
| 2015/0254732 A1 | 9/2015 | Snyder | | |
| 2016/0275554 A1 | 9/2016 | Yan | | |
| 2017/0024362 A1* | 1/2017 | Borders | ............... | G06F 17/212 |
| 2017/0032554 A1* | 2/2017 | O'Donovan | ........... | G06N 7/005 |

* cited by examiner

PROGRAMMATIC GENERATION OF GRAPHICAL DISPLAY SOURCE CODE FOR A COMPUTERIZED GRAPHICAL ADVERTISEMENT DISPLAY

FIELD OF THE TECHNOLOGY

The present technology relates to the generation of graphical display source code for a computerized graphical advertisement display, and, more particularly, to the generation of graphical display source code based on a computer-generated layout description.

BACKGROUND

Publisher systems can provide webpages or other online content that can include one or more advertisement display opportunities for computerized graphical advertisement displays (e.g., space for a banner advertisement across the top of the webpage, within an application, or within other media such as videos or images). In some instances, when a user device (e.g., a computer running a web browser) processes a webpage for display, the user device can request, from an ad system, graphical display source code for a computerized graphical advertisement display for one of the advertisement display opportunities. The ad system can provide the graphical display source code to the user device to render and/or display. In some systems, the layouts (e.g., the arrangement, size, and characteristics) used for computerized graphical advertisement displays are static. This can result in ad systems using layouts for computerized graphical advertisement displays that are not tailored for display on a particular user device, within a particular application, for a particular user.

SUMMARY

Accordingly, there is a need for technology to dynamically generate graphical display source code for a computerized graphical advertisement display based upon a computer-generated layout description. The technology described herein beneficially provides computerized graphical advertisement displays that are tailored for display on a particular user device, within a particular application, for a particular user.

In one aspect there is a computer-implemented method of generating graphical display source code for a computerized graphical advertisement display. The method includes receiving, by a computer, from a user device, a request for the graphical display source code for the computerized graphical advertisement display. The method includes retrieving, by the computer, one or more seed layout descriptions, each seed layout description of the one or more seed layout descriptions specifying a plurality of associated constrained layout characteristics. The method includes generating, by the computer, a plurality of candidate layout descriptions based on at least the one or more seed layout descriptions, each candidate layout description of the plurality of candidate layout descriptions specifying a plurality of associated constrained layout characteristics, wherein one or more candidate layout descriptions of the plurality of candidate layout descriptions are generated by the computer altering one or more of the plurality of associated constrained layout characteristics of a seed layout description of the one or more seed layout descriptions. The method includes generating, by the computer, a plurality of layout scores, each layout score of the plurality of layout scores associated with a candidate layout description of the plurality of candidate layout descriptions. The method includes selecting, by the computer, a selected layout description from the plurality of candidate layout descriptions based on the plurality of layout scores. The method includes generating, by the computer, the graphical display source code based on the selected layout description, a size of the computerized graphical advertisement display, and one or more display capabilities of the user device. The method includes providing, by the computer, to the user device, the graphical display source code.

In some embodiments, the method includes rendering, by the user device, the graphical display source code to display the computerized graphical advertisement display. In some embodiments, the graphical display source code comprises one or more of HTML code or JAVASCRIPT. In some embodiments, the plurality of associated constrained layout characteristics of a seed layout description includes one or more of positional information, a number of products displayed, an arrangement of products displayed, a presence and a priority of an image associated with a product, size constraints of an image associated with a product, a presence and a priority of a title associated with a product, size constraints of a title associated with a product, a presence and a priority of a description associated with a product, size constraints of a description associated with a product, a presence and a priority of a price associated with a product, size constraints of a price associated with a product, a presence and a priority of a promotional offer, size constraints of a promotional offer, a presence and a priority of a call to action, size constraints of a call to action, a presence and a priority of an availability associated with a product, and size constraints of an availability of a product.

In some embodiments, the step of generating, by the computer, the plurality of candidate layout descriptions based on at least the one or more seed layout descriptions comprises excluding, by the computer, one or more candidate layout descriptions based on a pre-determined constraint on a constrained layout characteristic. In some embodiments, the step of generating, by the computer, the plurality of candidate layout descriptions based on at least the one or more seed layout descriptions comprises excluding, by the computer, one or more candidate layout descriptions by random sampling. In some embodiments, the step of generating, by the computer, the plurality of candidate layout descriptions based on at least the one or more seed layout descriptions comprises excluding, by the computer, one or more candidate layout descriptions based on predicted scores associated with the one or more candidate layout descriptions.

In some embodiments, the step of generating, by the computer, the plurality of layout scores, each layout score of the plurality of layout scores associated with a candidate layout description of the plurality of candidate layout descriptions comprises generating, by the computer, the score for a candidate layout description based on one or more of a predicted probability of interaction by a user with a computerized graphical advertisement display based on the candidate layout description, an expected sales amount associated with the candidate layout description; and an expected value associated with the candidate layout description. In some embodiments, the interaction by a user with the computerized graphical advertisement display based on the candidate layout description is a click on the computerized graphical advertisement display based on the candidate layout description.

In some embodiments, the step of generating, by the computer, the plurality of layout scores, each layout score of the plurality of layout scores associated with a candidate layout description of the plurality of candidate layout descriptions comprises generating, by the computer, the score for a candidate layout description based on one or more of a display context for the computerized graphical display, historical performance data for the candidate layout description, behavioral data for a user associated with the user device, one or more recommended products for display in the computerized graphical display, a temporal context for the computerized graphical display, and a geographical context for the computerized graphical display.

In some embodiments, the step of selecting, by the computer, the selected layout description from the plurality of candidate layout descriptions based on the plurality of layout scores comprises selecting, by the computer, a candidate layout description from the plurality of candidate layout descriptions having a highest layout score of the plurality of layout scores. In some embodiments, the step of selecting, by the computer, the selected layout description from the plurality of candidate layout descriptions based on the plurality of layout scores comprises selecting, by the computer, a candidate layout description from the plurality of candidate layout descriptions having a layout score lower than a highest layout score of the plurality of layout scores. In some embodiments, the step of selecting, by the computer, the selected layout description from the plurality of candidate layout descriptions based on the plurality of layout scores comprises selecting, by the computer, a candidate layout description from the plurality of candidate layout descriptions based on sampling a subset of the plurality of candidate layout descriptions, wherein the subset is determined based on the plurality of layout scores.

In some embodiments, the method includes altering, by the computer, one or more constrained layout characteristics of the selected layout description, wherein the one or more constrained layout characteristics are independent of the size of the computerized graphical advertisement display and position-independent, based on one or more of a display context for the computerized graphical display, historical performance data for the selected layout description, behavioral data for a user associated with the user device, one or more recommended products for display in the computerized graphical display, a temporal context for the computerized graphical display, and a geographical context for the computerized graphical display. In some embodiments, one or more candidate layout descriptions of the plurality of candidate layout descriptions are generated by the computer altering one or more of the plurality of associated constrained layout characteristics of a second candidate layout description of the plurality of candidate layout descriptions.

In some embodiments, the step of retrieving, by the computer, the one or more seed layout descriptions comprises selecting, by the computer, the one or more seed layout descriptions based on the one or more display capabilities of the user device. In some embodiments, the method includes selecting, by the computer, a second selected layout description from the plurality of candidate layout descriptions based on the plurality of layout scores, generating, by the computer, second graphical display source code based on the second selected layout description, the size of the computerized graphical advertisement display, and the one or more display capabilities of the user device, and providing, by the computer, to the user device, the second graphical display source code.

In some embodiments, the method includes selecting, by the user device, selected graphical display source from the graphical display source code and the second graphical display source code based on a state of the user device, and rendering, by the user device, the selected graphical display source code to display the computerized graphical advertisement display.

In another aspect there is a computer-implemented method of generating graphical display source code for a computerized graphical advertisement display. The method includes receiving, by a computer, from a user device, a request for the graphical display source code for the computerized graphical advertisement display. The method includes retrieving, by the computer, one or more seed layout descriptions, each seed layout description of the one or more seed layout descriptions specifying a plurality of associated constrained layout characteristics. The method includes generating, by the computer, a plurality of candidate layout descriptions based on at least the one or more seed layout descriptions, each candidate layout description of the plurality of candidate layout descriptions specifying a plurality of associated constrained layout characteristics, wherein one or more candidate layout descriptions of the plurality of candidate layout descriptions are generated by the computer altering one or more of the plurality of associated constrained layout characteristics of a seed layout description of the one or more seed layout descriptions. The method includes generating, by the computer, a plurality of candidate graphical display descriptions based on the plurality of candidate layout descriptions, each candidate graphical display description of the plurality of candidate graphical display descriptions specifying a plurality of associated graphical display characteristics, wherein each candidate graphical display description of the plurality of candidate graphical display descriptions is generated based on a candidate layout description of the plurality of candidate layout descriptions and a size of the computerized graphical advertisement display. The method includes generating, by the computer, a plurality of display description scores, each display description score of the plurality of display description scores associated with a candidate graphical display description of the plurality of candidate graphical display descriptions. The method includes selecting, by the computer, a selected graphical display description from the plurality of candidate graphical display descriptions based on the plurality of display description scores. The method includes generating, by the computer, the graphical display source code based on a candidate layout description used to generate the selected graphical layout description, size of the computerized graphical advertisement display, and one or more display capabilities of the user device. The method includes providing, by the computer, to the user device, the graphical display source code.

In some embodiments, the method includes rendering, by the user device, the graphical display source code to display the computerized graphical advertisement display. In some embodiments, the graphical display source code comprises one more of HTML code or JAVASCRIPT.

In some embodiments, the plurality of associated constrained layout characteristics of a seed layout description includes one or more of positional information, a number of products displayed, an arrangement of products displayed, a presence and a priority of an image associated with a product, size constraints of an image associated with a product, a presence and a priority of a title associated with a product, size constraints of a title associated with a product, a presence and a priority of a description associated with a product, size constraints of a description associated with a product, a presence and a priority of a price associated with a product, size constraints of a price associated with a product, a presence and a priority of a promotional offer, size constraints of a promotional offer, a presence and a priority of a call to action, size constraints of a call to action, a presence and a priority of an availability associated with a product, and size constraints of an availability of a product.

In some embodiments, the step of generating, by the computer, the plurality of candidate layout descriptions based on at least the one or more seed layout descriptions comprises excluding, by the computer, one or more candidate layout descriptions based on a pre-determined constraint on a constrained layout characteristic. In some embodiments, the step of generating, by the computer, the plurality of candidate layout descriptions based on at least the one or more seed layout descriptions comprises excluding, by the computer, one or more candidate layout descriptions by random sampling. In some embodiments, the step of generating, by the computer, the plurality of candidate graphical display descriptions based on the plurality of candidate layout descriptions comprises excluding, by the computer, one or more candidate graphical display descriptions based on a pre-determined constraint on a graphical display characteristic. In some embodiments, the step of generating, by the computer, the plurality of candidate graphical display descriptions based on the plurality of candidate layout descriptions comprises excluding, by the computer, one or more candidate graphical display descriptions by sampling. In some embodiments, the step of generating, by the computer, the plurality of candidate graphical display descriptions based on the plurality of candidate layout descriptions comprises excluding, by the computer, one or more candidate graphical display descriptions based on predicted scores associated with the one or more graphical display characteristics.

In some embodiments, the step of generating, by the computer, the plurality of candidate graphical display descriptions based on the plurality of candidate layout descriptions comprises determining, by the computer, a first candidate graphical display description is similar to a second candidate graphical display description, and excluding, by the computer, the first candidate graphical display descriptions. In some embodiments, the step of determining, by the computer, the first candidate graphical display description is similar to the second candidate graphical display description comprises determining, by the computer, a first graphical display characteristic score based on one or more of the plurality of associated graphical display characteristics of the first candidate graphical display description, determining, by the computer, a second graphical display characteristic score based on one or more of the plurality of associated graphical display characteristics of the second candidate graphical display description, and determining, by the computer, a difference between the first graphical display characteristic score and the second graphical display characteristic score is less than a predetermined amount. In some embodiments, the step of determining, by the computer, the first candidate graphical display description is similar to the second candidate graphical display description comprises comparing, by the computer, one or more of the plurality of associated graphical display characteristics of the first candidate graphical display description to one or more of the plurality of associated graphical display characteristics of the second candidate graphical display description.

In some embodiments, the plurality of associated graphical display characteristics of a candidate graphical display description includes one or more of positional information, a number of products displayed, an arrangement of products displayed, an image associated with a product, a size of an image associated with a product, a title associated with a product, a size of a title associated with a product, a description associated with a product, a size of a description associated with a product, a price associated with a product, a size of a price associated with a product, a promotional offer, a size of a promotional offer, a call to action, a size of a call to action, an availability associated with a product, and a size of an availability of a product.

In some embodiments, the step of generating, by the computer, the plurality of display description scores, each display description score of the plurality of display description scores associated with a candidate graphical display description of the plurality of candidate graphical display descriptions comprises generating, by the computer, the display description score for a candidate graphical display description based on one or more of a predicted probability of interaction by a user with a computerized graphical advertisement display conforming to the candidate graphical display description, an expected sales amount associated with the candidate graphical display description; and an expected value associated with the candidate graphical display description. In some embodiments, the interaction by a user with the computerized graphical advertisement display conforming to the candidate graphical display description is a click on the computerized graphical advertisement display conforming to the candidate graphical display description.

In some embodiments, the step of generating, by the computer, the plurality of display description scores, each display description score of the plurality of display description scores associated with a candidate graphical display description of the plurality of candidate graphical display descriptions comprises generating, by the computer, the score for a candidate graphical display description based on one or more of a display context for the computerized graphical display, historical performance data for one or more of the plurality of associated graphical display characteristics of the candidate graphical display description, behavioral data for a user associated with the user device, one or more recommended products for display in the computerized graphical display, a temporal context for the computerized graphical display, and a geographical context for the computerized graphical display.

In some embodiments, the step of selecting, by the computer, the selected graphical display description from the plurality of candidate graphical display descriptions based on the plurality of display description scores comprises selecting, by the computer, a candidate graphical display description from the plurality of candidate graphical display descriptions having a highest display description score of the plurality of display description scores. In some embodiments, the step of selecting, by the computer, the selected graphical display description from the plurality of candidate graphical display descriptions based on the plurality of display description scores comprises selecting, by the computer, a candidate graphical display description from the plurality of candidate graphical display descriptions having a display description score lower than a highest display description score of the plurality of display description scores. In some embodiments, the step of selecting, by the computer, the selected graphical display description from the plurality of candidate graphical display descriptions based on the plurality of display description scores comprises selecting, by the computer, a candidate graphical display description from the plurality of candidate graphical display descriptions based on sampling a subset of the plurality of candidate graphical display descriptions, wherein the subset is determined based on the plurality of display description scores.

In some embodiments, the method includes altering, by the computer, one or more graphical display characteristics of the selected graphical display description, wherein the one or more graphical display characteristics are position-independent, based on one or more of a display context for the computerized graphical display, historical performance data for the selected graphical display description, behavioral data for a user associated with the user device, one or more recommended products for display in the computerized graphical display, a temporal context for the computerized graphical display, and a geographical context for the computerized graphical display. In some embodiments, one or more candidate layout descriptions of the plurality of candidate layout descriptions are generated by the computer altering one or more of the plurality of associated constrained layout characteristics of a second candidate layout description of the plurality of candidate layout descriptions.

In some embodiments, the step of retrieving, by the computer, the one or more seed layout descriptions comprises selecting, by the computer, the one or more seed layout descriptions based on the one or more display capabilities of the user device. In some embodiments, the method includes selecting, by the computer, a second selected graphical display description from the plurality of candidate graphical display descriptions based on the plurality of display description scores, generating, by the computer, second graphical display source code based on a candidate layout description used to generate the second selected graphical layout description, the size of the computerized graphical advertisement display, and the one or more display capabilities of the user device, and providing, by the computer, to the user device, the second graphical display source code. In some embodiments, the method includes selecting, by the user device, selected graphical display source from the graphical display source code and the second graphical display source code based on a state of the user device, and rendering, by the user device, the selected graphical display source code to display the computerized graphical advertisement display.

In another aspect there is a computer-implemented method of generating graphical display data for a computerized graphical advertisement display. The method includes receiving, by a computer, from a user device, a request for the graphical display data for the computerized graphical advertisement display. The method includes retrieving, by the computer, one or more seed layout descriptions, each seed layout description of the one or more seed layout descriptions specifying a plurality of associated constrained layout characteristics. The method includes generating, by the computer, a plurality of candidate layout descriptions based on at least the one or more seed layout descriptions, each candidate layout description of the plurality of candidate layout descriptions specifying a plurality of associated constrained layout characteristics, wherein one or more candidate layout descriptions of the plurality of candidate layout descriptions are generated by the computer altering one or more of the plurality of associated constrained layout characteristics of a seed layout description of the one or more seed layout descriptions. The method includes generating, by the computer, a plurality of candidate graphical display descriptions based on the plurality of candidate layout descriptions, each candidate graphical display description of the plurality of candidate graphical display descriptions specifying a plurality of associated graphical display characteristics, wherein each candidate graphical display description of the plurality of candidate graphical display descriptions is generated based on a candidate layout description of the plurality of candidate layout descriptions and a size of the computerized graphical advertisement display. The method includes generating, by the computer, a plurality of display description scores, each display description score of the plurality of display description scores associated with a candidate graphical display description of the plurality of candidate graphical display descriptions. The method includes selecting, by the computer, a selected graphical display description from the plurality of candidate graphical display descriptions based on the plurality of display description scores. The method includes generating, by the computer, the graphical display data based on a candidate layout description used to generate the selected graphical layout description and one or more display capabilities of the user device. The method includes providing, by the computer, to the user device, the graphical display data code.

In some embodiments, the graphical display data is image data or video data. In some embodiments, the step of generating, by the computer, the plurality of layout scores, each layout score of the plurality of layout scores associated with a candidate layout description of the plurality of candidate layout descriptions comprises generating, by the computer, the score for a candidate layout description based on one or more of a predicted probability of interaction by a user with a computerized graphical advertisement display based on the candidate layout description, an expected sales amount associated with the candidate layout description; and an expected value associated with the candidate layout description. In some embodiments, the computerized graphical advertisement display is a video, and the interaction by a user with the computerized graphical advertisement display based on the candidate layout description is viewing a predetermined portion of the video or a click on the computerized graphical advertisement display based on the candidate layout description.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The present technology provides systems and methods for the computerized generation of graphical display source code for computerized graphical advertisement displays. In some embodiments, the technology can improve computerized graphical advertisement displays by generating graphical display source code optimized for the particular computing device on which the computerized graphical advertisement display will be rendered, as well as for a user of the computing device. Beneficially, the technology can programmatically generate varied candidate layout descriptions for the computerized graphical advertisement display and select a candidate layout description from the candidate layout descriptions for use in generating the graphical display source code for the computerized graphical advertisement display.

Although the technology is illustrated and described herein with reference to specific embodiments, the technology is not intended to be limited to the details shown. Various modifications can be made in the details within the scope the claims and without departing from the technology.

Environment and Systems

Figure 1:
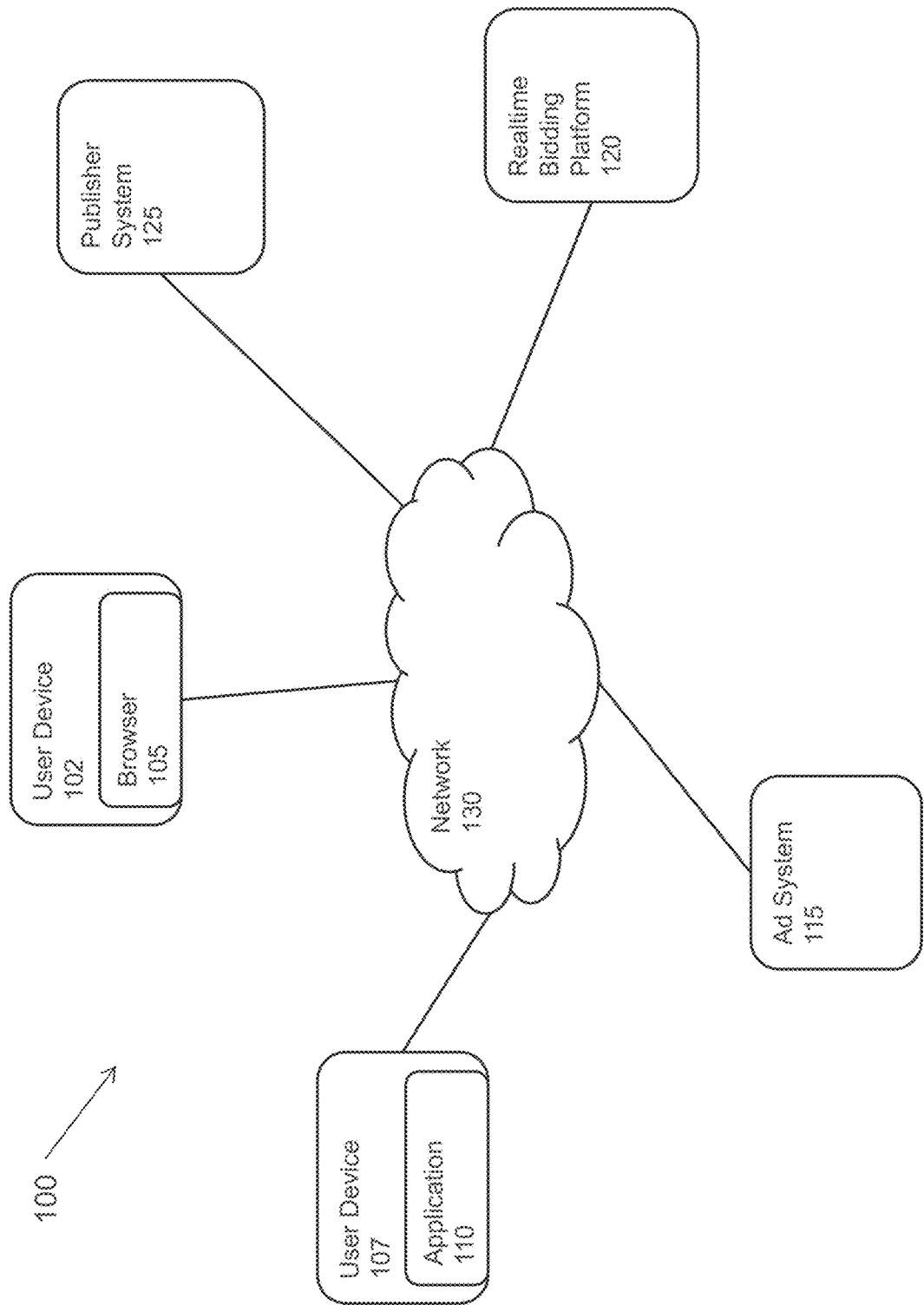
FIG. 1 is a diagram of a networked system in accordance with embodiments of the technology.

FIG. 1 is a diagram of networked system 100 in accordance with embodiments of the technology. As illustrated, networked system 100 can include user device 102, user device 107, ad system 115, realtime bidding ("RTB") platform 120, and publisher system 125. User device 102, user device 107, ad system 115, RTB platform 120, and publisher system 125 can be in data communication via network 130. User devices 102 and 107 can each be any computing devices. In some embodiments, user devices 102 and 107 can each be one of a mobile computing device (e.g., cellular phones and/or tablets), a PC, or other computing device. User device 102 executes web browser 105. User device 107 executes application 110 (e.g., a mobile application that interacts with online content).

Ad system 115 can be any computing device, such as a server or multiple servers. In some embodiments, ad system 115 can collect behavioral data for a plurality of devices, browsers, and/or applications. In some embodiments, ad system 115 can receive behavioral data for a plurality of devices, browsers, and/or applications from third-parties. In some embodiments, ad system 115 can provide graphical display source code for a computerized graphical advertisement display in accordance with the present technology.

RTB platform 120 can be any computing device, such as a server or multiple servers. In some embodiments, RTB platform 120 can perform auctions for advertising display opportunities in online media, such as webpages or application content served by publisher system 125, that are provided to user devices 102 and/or 107. Ad system 115 can submit bids for such advertising opportunities, and if ad system 115 wins the auction, ad system 115 can provide source code or other display data for a computerized graphical advertisement display to fill the advertising display opportunity. Publisher system 125 can be any computing device, such as a server or multiple servers. In some embodiments, publisher system 125 can serve webpages to browser 105. In some embodiments, publisher system 125 can serve other content to application 110. In some embodiments, publisher system 125 can communicate with ad system 115 to determine whether ad system 115 will provide source code for a computerized graphical advertisement display to fill an advertisement display opportunity in a webpage or application content. Network 130 can be any network or multiple networks. For example, network 140 can include cellular networks through which user devices 102 and 107 are connected and the Internet.

Layout Descriptions and Graphical Display Descriptions

The present technology provides systems and methods for the computerized generation of graphical display source code based on programmatically generated layout descriptions. Generally, a layout description is a computer data structure that describes the layout of the elements of computerized displays independent of the size of any particular computerized display. For example, the layout description can describe the elements and their arrangement in relative terms. Beneficially, this can permit a layout description to describe the layout of the elements for computerized displays of different sizes. A layout description can include one or more constrained layout characteristics, each specifying an aspect of the layout. An exemplary layout description follows:

```
Layout{
    Container "1"{
        Position{
            left:1
            top:1
        }
        Height{
            Rel-max: 50
        }
        Width{
            Rel-max: 50
        }
        Children [
            Image{
                Position{
                    left:1
                    top:1
                }
                Height{
                    Max: 40
                    Min: 10
                }
                Width{
                    Max: 40
                    Min: 10
                }
            }
            Text{
                Position{
                    left:1
                    top:2
                }
                Height{
                    Max: 20
                    Min: 10
                }
                Width{
                    Max: 40
                    Min: 10
                }
            }
        ]
    }
    Container "2"{
        Position{
            left:1
            top:2
        }
        Height{
            Rel-max: 50
        }
        Width{
            Rel-max: 50
        }
        Children [
```

```
Image{
    Position{
        left:1
        top:1
    }
    Height{
        Max: 40
        Min: 10
    }
    Width{
        Max: 40
        Min: 10
    }
}
Text{
    Position{
        left:1
        top:2
    }
    Height{
        Max: 20
        Min: 10
    }
    Width{
        Max: 40
        Min: 10
    }
}
]
}
Container "3"{
    Position{
        left:2
        top:1
    }
    Height{
        Rel-max: 50
    }
    Width{
        Rel-max: 50
    }
    Children [
        Image{
            Position{
                left:1
                top:1
            }
            Height{
                Max: 40
                Min: 10
            }
            Width{
                Max: 40
                Min: 10
            }
        }
        Text{
            Position{
                left:1
                top:2
            }
            Height{
                Max: 20
                Min: 10
            }
            Width{
                Max: 40
                Min: 10
            }
        }
    ]
}
Container "4"{
    Position{
        left:2
        top:2
    }
    Height{
        Rel-max: 50
    }
    Width{
        Rel-max: 50
    }
    Children [
        Image{
            Position{
                left:1
                top:1
            }
            Height{
                Max: 40
                Min: 10
            }
            Width{
                Max: 40
                Min: 10
            }
        }
        Text{
            Position{
                left:1
                top:2
            }
            Height{
                Max: 20
                Min: 10
            }
            Width{
                Max: 40
                Min: 10
            }
        }
    ]
}
```

The exemplary layout description provides the layout of a computerized display having four container elements, with each container element containing an image element and a text element. In the exemplary layout description, "Layout" indicates the beginning of the layout description. "Container" indicates a container element. As illustrated, the first container element includes a "Position" tag indicating that the container element is positioned as the first element from the left and the first element from the top of the layout. The first container element, Container "1," includes a "Height" tag indicating that the height of the container is 50 percent of the layout's height and a "Width" tag indicating that the width of the container is 50 percent of the layout's width. Within the first container element, there is an "Image" element. The image element includes a "Position" tag indicating that the image is positioned as the first element from the left and the first element from the top of the container. The image element includes a "Height" tag indicating that the height of the image must be between 10 and 40 pixels and a "Width" tag indicating that the width of the image must be between 10 and 40 pixels. Further, within the first container element, there is a "Text" element. The text element includes a "Position" tag indicating that the text is positioned as the first element from the left and the second element from the top of the container. The text element includes a "Height" tag indicating that the height of the text must be between 10 and 20 pixels and a "Width" tag indicating that the width of the text must be between 10 and 40 pixels.

In the exemplary layout description, the remaining container elements are similarly specified. For example, the second container element, Container "2," includes a "Position" tag indicating that the container element is positioned as the first element from the left and the second element from the top of the layout. The third container element, Container "3," includes a "Position" tag indicating that the container element is positioned as the second element from the left and the first element from the top of the layout. The fourth container element, Container "4," includes a "Position" tag indicating that the container element is positioned as the second element from the left and the second element from the top of the layout. Each of the second, third, and fourth container elements include an image element and a text element specified in a manner similar to the first container element.

In the exemplary layout, any of the elements or the attributes of an element (e.g., position, width, height, etc.) can be constrained layout characteristics. More generally, constrained layout characteristics can be a number of products displayed, an arrangement of products displayed, and positional information for one or more of the products. A constrained layout characteristic can specify a presence and a priority of an image associated with a product, a size of an image associated with a product, a presence and a priority of a title associated with a product, a size of a title associated with a product, a presence and a priority of a description associated with a product, a size of a description associated with a product, a presence and a priority of a price associated with a product, or a size of a price associated with a product. A constrained layout characteristic can specify a presence and a priority of a promotional offer, a size of a promotional offer, a presence and a priority of a call to action, and a size of a call to action. More generally, a constrained layout characteristic can specify the presence, size, and/or position of any element of the layout description.

Figure 2:
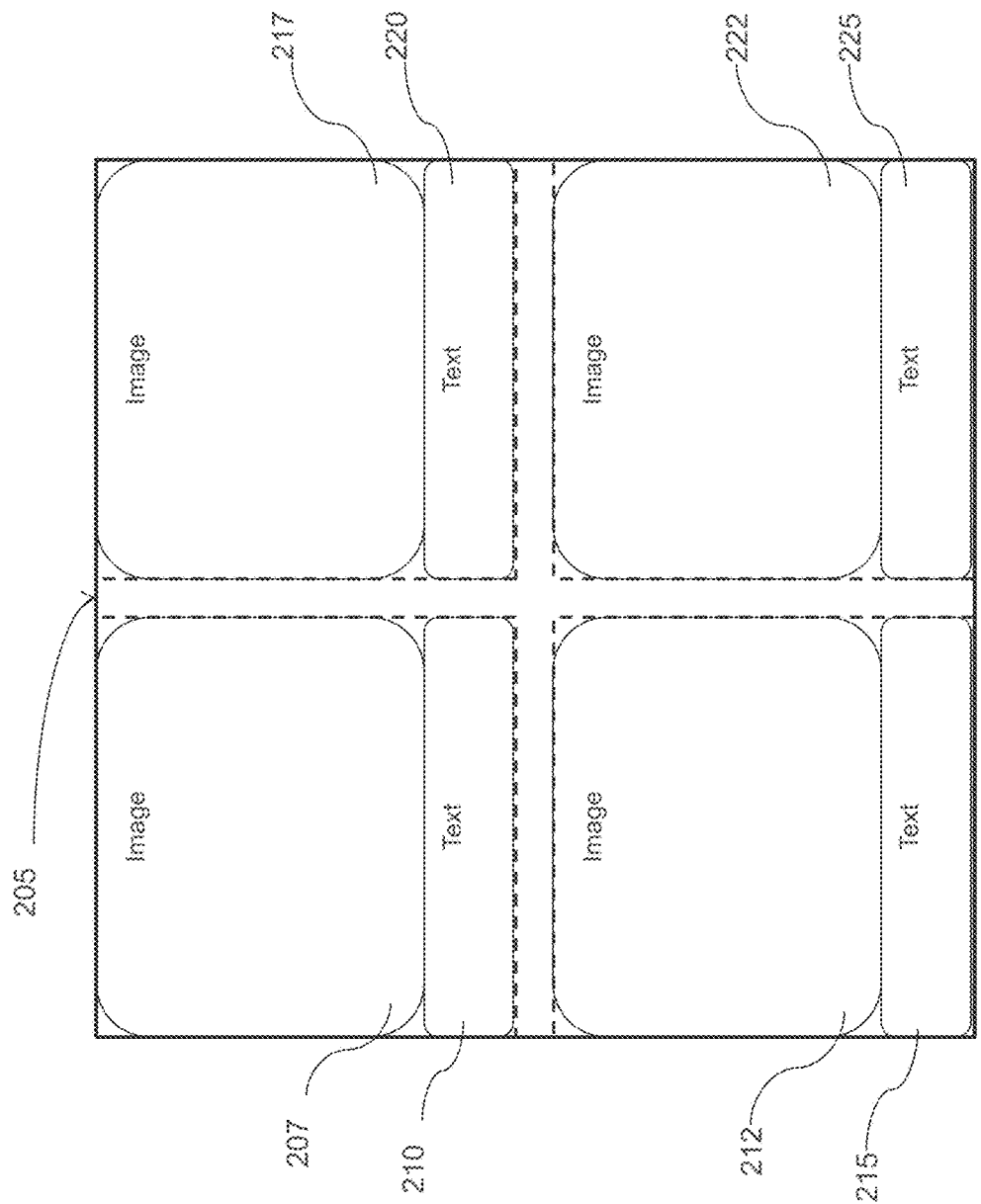
FIG. 2 illustrates an exemplary layout description.

FIG. 2 illustrates the exemplary layout description. Visualized layout 205 includes image element 207 and text element 210 corresponding to the image element and the text element in the first container element. As illustrated, image element 207 and text element 210 within Container "1" are positioned as the first element from the left of visualized layout 205 and the first element from the top of visualized layout 205. Within Container "1," image element 207 is positioned as the first element from the left of Container "1" and the first element from the top of Container "1." Text element 210 is positioned as the first element from the left of Container "1" and the second element from the top of Container "1." The remaining elements of the exemplary layout description are similarly illustrated in FIG. 2. Image element 212 and text element 215 correspond to the image element and text element in Container "2." Image element 217 and text element 220 correspond to the image element and text element in Container "3." Image element 222 and text element 225 correspond to the image element and text element in Container "4."

In accordance with the technology, an ad system can generate a graphical display description based on a layout description and a size of a computerized display. Graphical display descriptions reflect the visual appearance of the computerized display for a particular size. A graphical display description can include one or more graphical display characteristics specifying one or more aspects of the visual appearance of the computerized display when rendered. Graphical display characteristics can specify positional information, a number of products displayed, an arrangement of products displayed, an image associated with a product, a size of an image associated with a product, a title associated with a product, a size of a title associated with a product, a description associated with a product, a size of a description associated with a product, a price associated with a product, a size of a price associated with a product, a promotional offer, a size of a promotional offer, a call to action, a size of a call to action, an availability associated with a product, or a size of an availability of a product.

For example, referring to the exemplary layout description above, an ad system can generate a graphical display description for a display 90 pixels wide by 110 pixels high based on the exemplary layout description. The resulting graphical display description can specify that each image element is 40 pixels wide by 40 pixels high and each text element is 40 pixels wide by 10 pixels high. The resulting graphical display description can further specify the location of the elements in terms of pixels. For example, the position of the image element of Container "1" can be specified as 0 pixels from the left of the computerized display and 0 pixels from the top of the display. As another example, the position of the text element of Container "1" can be specified as 0 pixels from the left of the computerized display and 40 pixels from the top of the display.

Generation of Computerized Graphical Advertisement Displays

Figure 3:
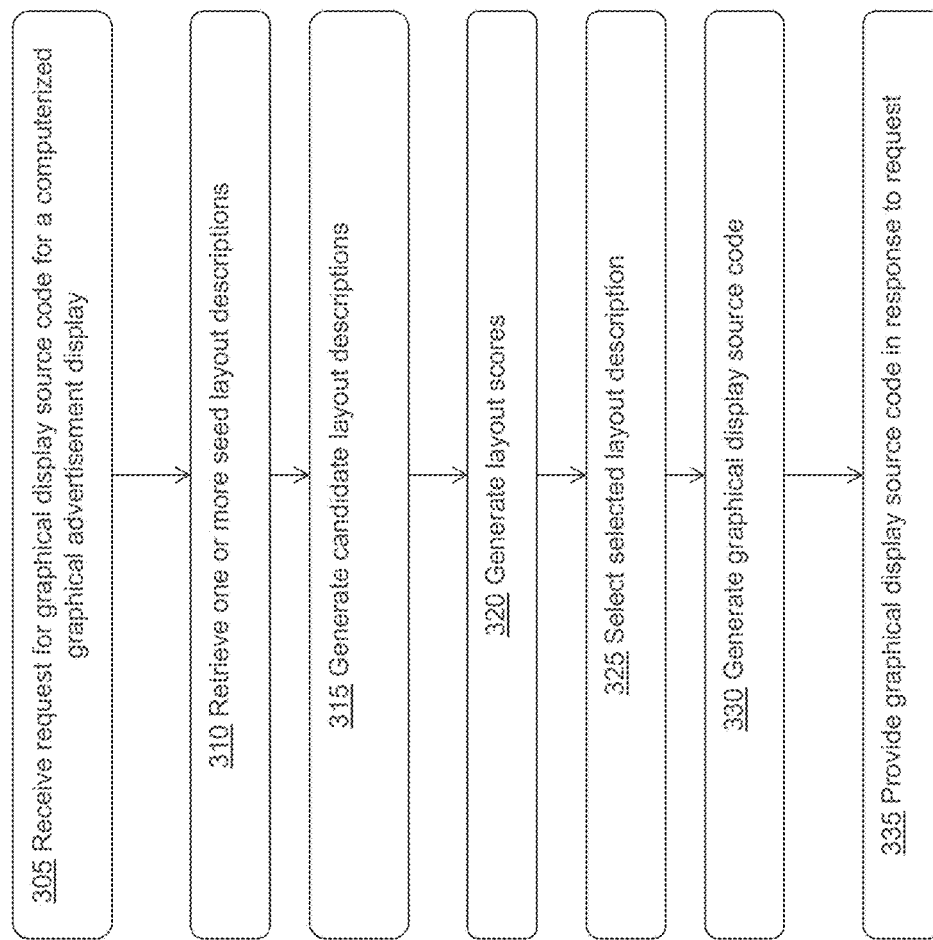
FIG. 3 depicts a flow chart for the generation of graphical display source code for a computerized graphical advertisement display.

FIG. 3 depicts a flow chart for the generation of graphical display source code for a computerized graphical advertisement display. At step 305, an ad system (e.g., ad system 115) receives a request for graphical display source code for a computerized graphical advertisement display. The request can be received from a browser or other application executing on a user device (e.g., browser 105 on user device 102). At step 310, the ad system retrieves one or more seed layout descriptions. In some embodiments, the ad system can retrieve the seed layout descriptions from system memory or other storage accessibly by the ad system. In some embodiments, the ad system can retrieve the seed layout descriptions based on display capabilities of the user device. For example, seed layout descriptions can be retrieved that are potentially usable based on the resolution and screen size of the user device. Each of the seed layout descriptions can specify associated constrained layout characteristics. For example, as described above, the constrained layout characteristics can provide positional information, a number of products displayed, an arrangement of products displayed, a presence and a priority of an image associated with a product, size constraints of an image associated with a product, a presence and a priority of a title associated with a product, size constraints of a title associated with a product, a presence and a priority of a description associated with a product, size constraints of a description associated with a product, a presence and a priority of a price associated with a product, size constraints of a price associated with a product, a presence and a priority of a promotional offer, size constraints of a promotional offer, a presence and a priority of a call to action, size constraints of a call to action, a presence and a priority of an availability associated with a product, and size constraints of an availability of a product.

Figure 4:
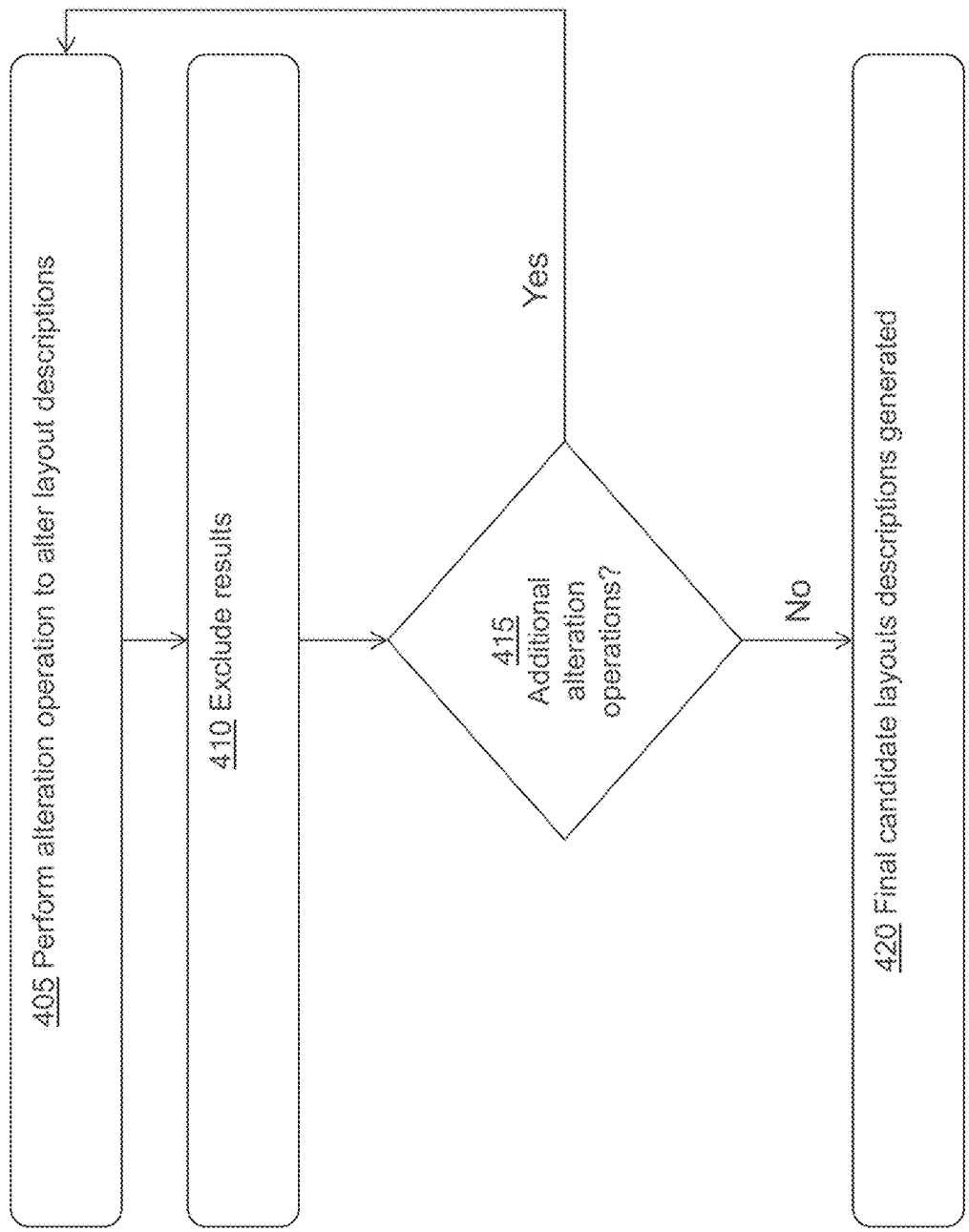
FIG. 4 depicts a flow chart for the generation of candidate layout descriptions.

At step 315, the ad system generates candidate layout descriptions. In some embodiments, the ad system can generate the candidate layout descriptions by altering one or more of the constrained layout characteristics of the seed layout descriptions or successively generated layout descriptions. FIG. 4 depicts a flow chart for the generation of candidate layout descriptions. In the first iteration of the illustrated method, at step 405, the ad system can perform a first alteration operation on the seed layout descriptions. An alteration operation can be any operation that can alter one or more constrained layout characteristics of the seed layout descriptions. For example, the ad system can alter the number of images associated with products in each seed layout description to generate additional layout descriptions. As another example, the ad system can alter the size of an element in each seed layout description to generate additional layout descriptions.

At step 410, the ad system can exclude one or more of the resulting layout descriptions generated in step 405. Excluding a layout description prevents the ad system from using the layout description in later steps of the illustrated method. In some embodiments, a layout description can be excluded based on a pre-determined constraint on a constrained layout characteristic of the layout description. For example, the requesting user device (or an application running thereon) can have pre-defined constraints on the size, resolution, or navigation of computerized graphical advertisement displays. Based on these constraints, the ad system can exclude any layout descriptions generated in step 405 having constrained layout characteristics that would not display properly on the user device. As another example, the ad system can define a pre-determined constraint specifying that a candidate layout description must have more than one and less than five images associated with products. Based on this exemplary constraint, the ad system can exclude any layout descriptions generated in step 405 that include less than two or more than four images associated with products. In some embodiments, layout descriptions can be excluded by random sampling. For example, the ad system can exclude a layout description based on a number generated by a random (or pseudorandom) number generator. In some embodiments, resulting layout descriptions can be excluded based on predicted scores associated with candidate layout descriptions, such as anticipated performance (e.g., whether the layout description is expected to result in an ad that will generate a click or sale).

At step 415, the ad system determines whether there are more alteration operations to perform. If there are additional alteration operations to perform, the ad system proceeds to step 405. At step 405, the ad system performs the next alteration operation on the layout descriptions not excluded in step 410. For example, the ad system can alter the size of a first image in each of layouts as the next alteration operation. At step 410, the ad system can exclude one or more of the resulting layout descriptions generated in step 405. In this manner, the ad system can iteratively perform alteration operations to generate varied layout descriptions, using the layout candidates resulting from the previous iteration as the input for the next iteration. If there are no additional alteration operations to perform, the ad system proceeds to step 420. At step 420, the ad system has generated the final set of candidate layout descriptions. Variations of the illustrated method are contemplated. In some embodiments, the technology can include a single iteration to generate candidate layout descriptions. In some embodiments, layout descriptions can be excluded during each iteration. In some embodiments, layout descriptions can be excluded after all alteration operations have been performed.

With reference to FIG. 3, at step 320, the ad system generates layout scores for one or more of the candidate layout descriptions. In some embodiments, the ad system can generate the layout score for a candidate layout description based on an expected sales amount associated with the candidate layout description. In some embodiments, the ad system can generate the layout score for a candidate layout description based on an expected value associated with the candidate layout description. In some embodiments, the ad system can generate the layout score for a candidate layout description based on one or more recommended products to be included in the computerized graphical advertisement display based on the candidate layout description. In some embodiments, the ad system can generate the layout score for a candidate layout description based on a predicted probability of interaction by a user with a computerized graphical advertisement display based on the candidate layout description. In some embodiments, the interaction by a user can be a click on the computerized graphical advertisement display based on the candidate layout description.

In some embodiments, the ad system can generate the score for a candidate layout description based on a display context for the computerized graphical display, such as a webpage in which the computerized graphical display will be included. In some embodiments, the ad system can generate the score for a candidate layout description based on historical performance data for the candidate layout description, such as whether the computerized graphical displays generated based on the candidate layout description have resulted in clicks and/or sales in the past. In some embodiments, the ad system can generate the score for a candidate layout description based on behavioral data for a user associated with the user device, such as prior viewing and purchasing behavior. In some embodiments, the ad system can generate the score for a candidate layout description based on a temporal context for the computerized graphical display, such as the time of day, or a geographical context, such as the location of the user device, for the computerized graphical display.

At step 325, the ad system selects a selected layout description from the candidate layout descriptions based on the layout scores. In some embodiments, the ad system can select the candidate layout description having the highest layout score. In some embodiments, the ad system can select a candidate layout description that does not have the highest score. Beneficially, this can prevent the ad system from using the same layout description too frequently, and can permit the ad system to test the performance layout descriptions that have not been used frequently. In some embodiments, the ad system can select a candidate layout description based on sampling a subset of the plurality of candidate layout descriptions, wherein the subset is determined based on the plurality of layout scores.

In some embodiments, the ad system can alter the selected layout description. The ad system can alter constrained layout characteristics of the selected layout description that do not affect and/or are not affected by the size of the computerized graphical advertisement display or the position of the elements. For example, the ad system can alter the color of elements, whether an element blinks, etc. In some embodiments, the ad system can alter layout characteristics based on one or more of a display context for the computerized graphical display, historical performance data for the selected layout description, behavioral data for a user associated with the user device, one or more recommended products for display in the computerized graphical display, a temporal context for the computerized graphical display, and a geographical context for the computerized graphical display.

At step 330, the ad system generates graphical display source code based on the selected layout description, a size of the computerized graphical advertisement display, and display capabilities of the user device. In some embodiments, the graphical display source code can be HTML code, JAVASCRIPT, or a combination thereof. For example, the ad system can use the size of the computerized graphical advertisement display to determine the size and position of the elements of the selected layout description. The ad system can then generate, e.g., HTML code for such size and position-resolved elements. At step 335, the ad system provides the graphical display source code to the user device in the response to the user device's request. For example, the ad system can transmit the graphical display source code to the user device over a network (e.g., network 130). In some embodiments, the user device can render the graphical display source code to display the computerized graphical advertisement display. For example, a browser on the user device can render the graphical display source code to display the computerized graphical advertisement display as a part of a webpage.

In some embodiments, the ad system can select more than one selected layout description (e.g., at step 325). The ad system can select different layout descriptions suitable for display when the user device is in different states. For example, the ad system can select a selected layout description for when the user device is in a horizontal orientation and a selected layout description for when the user device is in a vertical orientation. More generally, different layout descriptions can be generated for any state of the user device, such as any aspect of the user device that the user can control dynamically (e.g., size of an advertisement display). The ad system can generate graphical display source code for each of the selected layouts (e.g., at step 330) and provide the graphical display source code for each selected layout to the user device (e.g., step 335). The user device can select graphical display source based on a state of the user device. The user device can render the selected graphical display source code to display the computerized graphical advertisement display.

Figure 5:
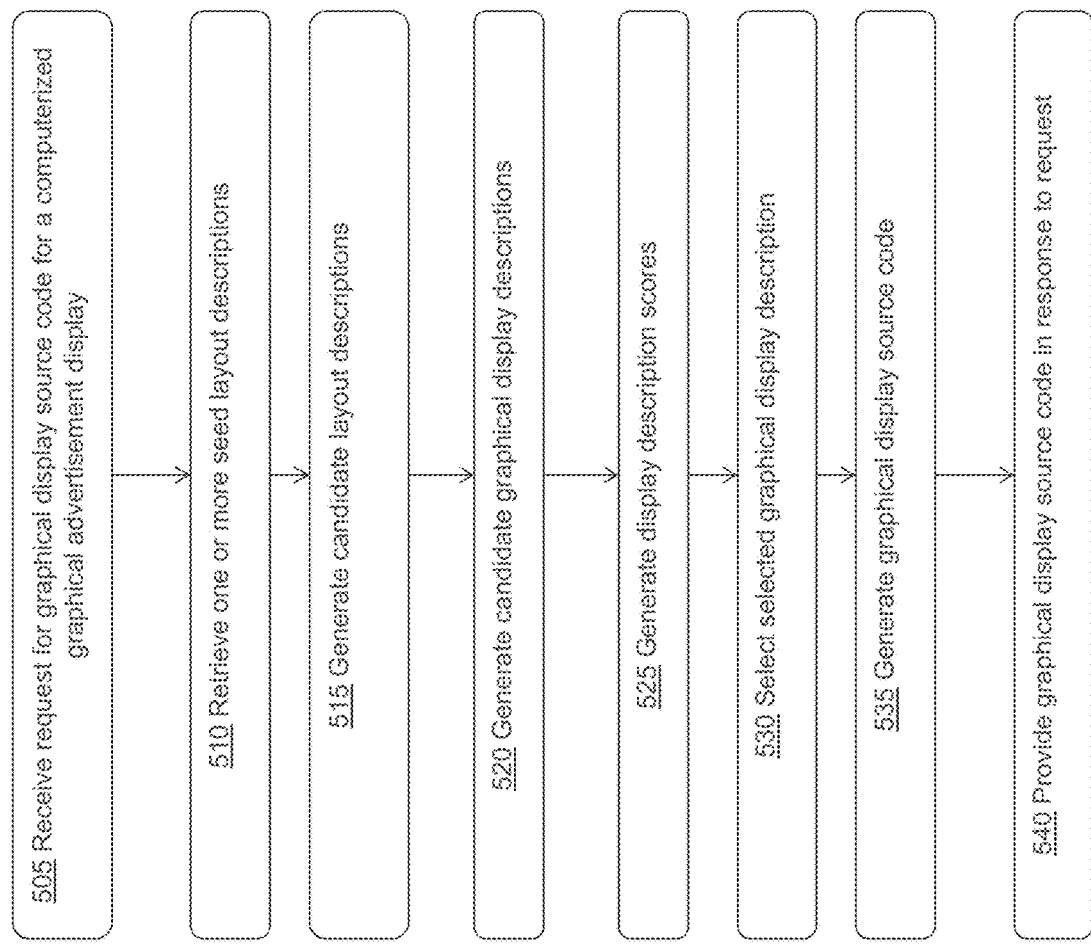
FIG. 5 depicts a flow chart for the generation of graphical display source code for a computerized graphical advertisement display.

FIG. 5 depicts a flow chart for the generation of graphical display source code for a computerized graphical advertisement display. At step 505, an ad system (e.g., ad system 115) receives a request for graphical display source code for a computerized graphical advertisement display. At step 510, the ad system retrieves one or more seed layout descriptions. At step 515, the ad system generates candidate layout descriptions. At step 520, the ad system generates candidate graphical display descriptions based on the candidate layout descriptions and the size of the computerized graphical advertisement display. In some embodiments, the ad system can exclude graphical display descriptions from the set of candidate graphical display descriptions. In some embodiments, the ad system can exclude a candidate graphical display description based on a pre-determined constraint on a graphical display characteristic, such as a constraint on the minimum size of elements (e.g., in pixels). In some embodiments, the ad system can exclude graphical display descriptions by sampling. In some embodiments, the ad system can exclude a graphical display description based on predicted scores associated with the one or more graphical display characteristics.

In some embodiments, the ad system can exclude a candidate graphical display description that is similar to another candidate graphical display description. For example, the ad system can determine a first graphical display characteristic score based on one or more of the graphical display characteristics of the first candidate graphical display description. The ad system can determine a second graphical display characteristic score based on one or more of the plurality of associated graphical display characteristics of the second candidate graphical display description. The ad system can then determine that the candidate graphical display descriptions are similar if the difference between the first graphical display characteristic score and the second graphical display characteristic score is less than a predetermined amount. In some embodiments, the ad system can determine the similarity between two candidate graphical descriptions by comparing one or more of the plurality of associated graphical display characteristics of the first candidate graphical display description to one or more of the plurality of associated graphical display characteristics of the second candidate graphical display description. For example, graphical display characteristics can be compared based on size and position. Larger differences in size and/or position indicate the graphical display characteristics are less similar.

At step 525, the ad system generates display description scores for one or more of the candidate layout descriptions. In some embodiments, the ad system can generate a display description score for a candidate graphical display description based on one or more of a predicted probability of interaction by a user with a computerized graphical advertisement display conforming to the candidate graphical display description, an expected sales amount associated with the candidate graphical display description; and an expected value associated with the candidate graphical display description. In some embodiments, the ad system can generate a display description score for a candidate graphical display description based on one or more of a display context for the computerized graphical display, historical performance data for one or more of the plurality of associated graphical display characteristics of the candidate graphical display description, behavioral data for a user associated with the user device, one or more recommended products for display in the computerized graphical display, a temporal context for the computerized graphical display, and a geographical context for the computerized graphical display.

At step 530, the ad system selects a selected graphical display description from the candidate graphical display descriptions based on the display description scores. In some embodiments, the ad system can select a candidate graphical display description having the highest display description score. In some embodiments, the ad system can select a candidate graphical display description having a display description score lower than the highest display description score. In some embodiments, the ad system can select a candidate graphical display description based on sampling a subset of the plurality of candidate graphical display descriptions.

In some embodiments, the ad system can alter the selected graphical display description. The ad system can alter graphical display characteristics of the selected graphical display description that do not affect and/or are not affected by the position of the elements. For example, the ad system can alter the color of elements, whether an element blinks, etc. In some embodiments, the ad system can alter graphical display characteristics based on one or more of a display context for the computerized graphical display, historical performance data for the graphical display description, behavioral data for a user associated with the user device, one or more recommended products for display in the computerized graphical display, a temporal context for the computerized graphical display, and a geographical context for the computerized graphical display.

At step 535, the ad system generates graphical display source code based on the selected graphical display description layout description and associated layout description. At step 540, the ad system provides the graphical display source code to the user device in the response to the user device's request.

In some embodiments, the ad system can select more than one selected graphical display description (e.g., at step 530). The ad system can select different graphical display descriptions suitable for display when the user device is in different states. For example, the ad system can select a selected graphical display description for when the user device is in a horizontal orientation and a selected graphical display description for when the user device is in a vertical orientation. More generally, different graphical display descriptions can be generated for any state of the user device, such as any aspect of the user device that the user can control dynamically (e.g., orientation, size of an advertisement display, etc.). The ad system can generate graphical display source code based on the selected graphical display description layout descriptions and associated layout descriptions (e.g., at step 535) and provide the graphical display source code for each selected graphical description to the user device (e.g., step 540). The user device can select graphical display source based on a state of the user device. The user device can render the selected graphical display source code to display the computerized graphical advertisement display.

While the above embodiments of the technology generate graphical display source code for a computerized graphical advertisement display, the technology can be used to generate other graphical display data for a computerized graphical advertisement display. For example, the technology can generate image data, or video data. In some embodiments, for example, generated HTML code can be rendered as a video or image and provided to a requesting user device. In some embodiments, layout descriptions and/or graphical display descriptions can be used to generate image data for video data directly. In some embodiments, an interaction by a user with the video computerized graphical advertisement can include viewing a predetermined portion of the video (e.g., a pre-roll portion) or a click on the video.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application specific-integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A computer-implemented method of generating graphical display source code for a computerized graphical advertisement display, the method comprising:

receiving, by a server computing device, from a user device, a request for the graphical display source code for the computerized graphical advertisement display;

retrieving, by the server computing device, one or more seed layout descriptions, each seed layout description of the one or more seed layout descriptions specifying a plurality of associated constrained layout characteristics;

generating, by the server computing device, a first plurality of candidate layout descriptions based on at least the one or more seed layout descriptions, each candidate layout description of the first plurality of candidate layout descriptions specifying a plurality of associated constrained layout characteristics, wherein one or more candidate layout descriptions of the first plurality of candidate layout descriptions are generated by the computer altering one or more of the plurality of associated constrained layout characteristics of a seed layout description of the one or more seed layout descriptions;

generating, by the server computing device, a layout score for each of the first plurality of candidate layout descriptions;

excluding, by the server computing device, one or more of the first plurality of candidate layout descriptions by sampling a subset of the first plurality of candidate layout descriptions based on the associated layout scores and excluding one or more of the sampled subset of the first plurality of candidate layout descriptions based on a number assigned to each candidate layout description in the sampled subset of the first plurality of candidate layout descriptions by a random number generator;

generating, by the server computing device, a second plurality of candidate layout descriptions based on the first plurality of candidate layout descriptions, each candidate layout description of the second plurality of candidate layout descriptions specifying a plurality of associated constrained layout characteristics, wherein one or more candidate layout descriptions of the second plurality of candidate layout descriptions are generated by the computer altering one or more of the plurality of associated constrained layout characteristics of a candidate layout description of the first plurality of candidate layout descriptions;

generating, by the server computing device, a layout score for each of the second plurality of candidate layout descriptions;

excluding, by the server computing device, one or more of the second plurality of candidate layout descriptions by sampling a subset of the second plurality of candidate layout descriptions based on the associated layout scores and excluding one or more of the sampled subset of the second plurality of candidate layout descriptions based on a number assigned to each candidate layout description in the sampled subset of the second plurality of candidate layout descriptions by a random number generator;

selecting, by the server computing device, a selected layout description from one of: the first plurality of candidate layout descriptions or the second plurality of candidate layout descriptions, based on the plurality of layout scores;

generating, by the server computing device, the graphical display source code based on the selected layout description, a size of the computerized graphical advertisement display, and one or more display capabilities of the user device; and providing, by the server computing device, to the user device, the graphical display source code.

2. The method of claim 1, further comprising:
rendering, by the user device, the graphical display source code to display the computerized graphical advertisement display.

3. The method of claim 1, wherein the graphical display source code comprises one or more of HTML code or JAVASCRIPT®.

4. The method of claim 1, wherein the plurality of associated constrained layout characteristics of a seed layout description includes one or more of positional information, a number of products displayed, an arrangement of products displayed, a presence and a priority of an image associated with a product, size constraints of an image associated with a product, a presence and a priority of a title associated with a product, size constraints of a title associated with a product, a presence and a priority of a description associated with a product, size constraints of a description associated with a product, a presence and a priority of a price associated with a product, size constraints of a price associated with a product, a presence and a priority of a promotional offer, size constraints of a promotional offer, a presence and a priority of a call to action, size constraints of a call to action, a presence and a priority of an availability associated with a product, and size constraints of an availability of a product.

5. The method of claim 1, wherein generating, by the server computing device, the first plurality of candidate layout descriptions based on at least the one or more seed layout descriptions comprises:
excluding, by the server computing device, one or more candidate layout descriptions of the first plurality of candidate layout descriptions based on a pre-determined constraint on a constrained layout characteristic.

6. The method of claim 1, wherein generating, by the server computing device, the first plurality of candidate layout descriptions based on at least the one or more seed layout descriptions comprises:
excluding, by the server computing device, one or more candidate layout descriptions of the first plurality of candidate layout descriptions based on predicted scores associated with the one or more candidate layout descriptions.

7. The method of claim 1, wherein selecting, by the server computing device, the selected layout description from the first plurality of candidate layout descriptions or the second plurality of candidate layout descriptions, based on the plurality of layout scores comprises:
selecting, by the server computing device, a candidate layout description from the first plurality of candidate layout descriptions or the second plurality of candidate layout descriptions having a highest layout score of the plurality of layout scores.

8. The method of claim 1, wherein selecting, by the server computing device, the selected layout description from the first plurality of candidate layout descriptions or the second plurality of candidate layout descriptions, based on the plurality of layout scores comprises:
selecting, by the server computing device, a candidate layout description from the first plurality of candidate layout descriptions or the second plurality of candidate layout descriptions having a layout score lower than a highest layout score of the plurality of layout scores.

9. The method of claim 1, wherein selecting, by the server computing device, the selected layout description from the first plurality of candidate layout descriptions or the second plurality of candidate layout descriptions, based on the plurality of layout scores comprises:

selecting, by the server computing device, a candidate layout description from the first plurality of candidate layout descriptions or the second plurality of candidate layout descriptions based on sampling a subset of the first plurality of candidate layout descriptions or the second plurality of candidate layout descriptions, wherein the subset is determined based on the plurality of layout scores.

10. The method of claim 1, further comprising:
altering, by the server computing device, one or more constrained layout characteristics of the selected layout description, wherein the one or more constrained layout characteristics are independent of the size of the computerized graphical advertisement display and position-independent, based on one or more of a display context for the computerized graphical display, historical performance data for the selected layout description, behavioral data for a user associated with the user device, one or more recommended products for display in the computerized graphical display, a temporal context for the computerized graphical display, and a geographical context for the computerized graphical display.

11. The method of claim 1, wherein retrieving, by the server computing device, the one or more seed layout descriptions comprises:
selecting, by the server computing device, the one or more seed layout descriptions based on the one or more display capabilities of the user device.

12. The method of claim 1, further comprising:
selecting, by the server computing device, a second selected layout description from the first plurality of candidate layout descriptions or the second plurality of candidate layout descriptions, based on the plurality of layout scores;
generating, by the server computing device, second graphical display source code based on the second selected layout description, the size of the computerized graphical advertisement display, and the one or more display capabilities of the user device; and
providing, by the server computing device, to the user device, the second graphical display source code.

13. The method of claim 12, further comprising:
selecting, by the user device, selected graphical display source from the graphical display source code and the second graphical display source code based on a state of the user device; and
rendering, by the user device, the selected graphical display source code to display the computerized graphical advertisement display.

14. A computer-implemented method of generating graphical display source code for a computerized graphical advertisement display, the method comprising:
receiving, by a server computing device, from a user device, a request for the graphical display source code for the computerized graphical advertisement display;
retrieving, by the server computing device, one or more seed layout descriptions, each seed layout description of the one or more seed layout descriptions specifying a plurality of associated constrained layout characteristics;
generating, by the server computing device, a first plurality of candidate layout descriptions based on at least the one or more seed layout descriptions, each candidate layout description of the first plurality of candidate layout descriptions specifying a plurality of associated constrained layout characteristics, wherein one or more candidate layout descriptions of the first plurality of candidate layout descriptions are generated by the computer altering one or more of the plurality of associated constrained layout characteristics of a seed layout description of the one or more seed layout descriptions;
generating, by the server computing device, a layout score for each of the first plurality of candidate layout descriptions;
excluding, by the server computing device, one or more of the first plurality of candidate layout descriptions by sampling a subset of the first plurality of candidate layout descriptions based on the associated layout scores and excluding one or more of the sampled subset of the first plurality of candidate layout descriptions based on a number assigned to each candidate layout description in the sampled subset of the first plurality of candidate layout descriptions by a random number generator;
generating, by the server computing device, a second plurality of candidate layout descriptions based on the first plurality of candidate layout descriptions, each candidate layout description of the second plurality of candidate layout descriptions specifying a plurality of associated constrained layout characteristics, wherein one or more candidate layout descriptions of the second plurality of candidate layout descriptions are generated by the computer altering one or more of the plurality of associated constrained layout characteristics of a candidate layout description of the first plurality of candidate layout descriptions;
generating, by the server computing device, a layout score for each of the second plurality of candidate layout descriptions;
excluding, by the server computing device, one or more of the second plurality of candidate layout descriptions by sampling a subset of the second plurality of candidate layout descriptions based on the associated layout scores and excluding one or more of the sampled subset of the second plurality of candidate layout descriptions based on a number assigned to each candidate layout description in the sampled subset of the second plurality of candidate layout descriptions by a random number generator;
generating, by the server computing device, a plurality of candidate graphical display descriptions based on one of: the first plurality of candidate layout descriptions or the second plurality of candidate layout descriptions, each candidate graphical display description of the plurality of candidate graphical display descriptions specifying a plurality of associated graphical display characteristics, wherein each candidate graphical display description of the plurality of candidate graphical display descriptions is generated based on a candidate layout description of the first plurality of candidate layout descriptions or the second plurality of candidate layout descriptions and a size of the computerized graphical advertisement display;
generating, by the server computing device, a plurality of display description scores, each display description score of the plurality of display description scores associated with a candidate graphical display description of the plurality of candidate graphical display descriptions;
selecting, by the server computing device, a selected graphical display descriptions from the plurality of candidate graphical display descriptions based on the plurality of display description scores;

generating, by the server computing device, the graphical display source code based on a candidate layout description used to generate each of the plurality of selected graphical layout descriptions, the size of the computerized graphical advertisement display, and one or more display capabilities of the user device; and providing, by the server computing device, to the user device, the graphical display source code.

15. The method of claim 14, further comprising:
rendering, by the user device, the graphical display source code to display the computerized graphical advertisement display.

16. The method of claim 14, wherein the graphical display source code comprises one more of HTML code or JAVASCRIPT®.

17. The method of claim 14, wherein the plurality of associated constrained layout characteristics of a seed layout description includes one or more of positional information, a number of products displayed, an arrangement of products displayed, a presence and a priority of an image associated with a product, size constraints of an image associated with a product, a presence and a priority of a title associated with a product, size constraints of a title associated with a product, a presence and a priority of a description associated with a product, size constraints of a description associated with a product, a presence and a priority of a price associated with a product, size constraints of a price associated with a product, a presence and a priority of a promotional offer, size constraints of a promotional offer, a presence and a priority of a call to action, size constraints of a call to action, a presence and a priority of an availability associated with a product, and size constraints of an availability of a product.

18. The method of claim 14, wherein generating, by the server computing device, the first plurality of candidate layout descriptions based on at least the one or more seed layout descriptions comprises:
excluding, by the server computing device, one or more candidate layout descriptions of the first plurality of candidate layout descriptions based on a pre-determined constraint on a constrained layout characteristic.

19. The method of claim 14, wherein generating, by the server computing device, the plurality of candidate graphical display descriptions based on one of: the first plurality of candidate layout descriptions or the second plurality of candidate layout descriptions comprises:
excluding, by the server computing device, one or more candidate graphical display descriptions based on a pre-determined constraint on a graphical display characteristic.

20. The method of claim 14, wherein generating, by the server computing device, the plurality of candidate graphical display descriptions based on the first plurality of candidate layout descriptions or the second plurality of candidate layout descriptions comprises:
excluding, by the server computing device, one or more candidate graphical display descriptions based on predicted scores associated with the one or more graphical display characteristics.

21. The method of claim 14, wherein generating, by the server computing device, the plurality of candidate graphical display descriptions based on the first plurality of candidate layout descriptions or the second plurality of candidate layout descriptions comprises:

determining, by the server computing device, a first candidate graphical display description is similar to a second candidate graphical display description; and excluding, by the server computing device, the first candidate graphical display descriptions.

22. The method of claim 21, wherein determining, by the server computing device, the first candidate graphical display description is similar to the second candidate graphical display description comprises:
determining, by the server computing device, a first graphical display characteristic score based on one or more of the plurality of associated graphical display characteristics of the first candidate graphical display description;
determining, by the server computing device, a second graphical display characteristic score based on one or more of the plurality of associated graphical display characteristics of the second candidate graphical display description; and
determining, by the server computing device, a difference between the first graphical display characteristic score and the second graphical display characteristic score is less than a predetermined amount.

23. The method of claim 21, wherein determining, by the server computing device, the first candidate graphical display description is similar to the second candidate graphical display description comprises:
comparing, by the computer, one or more of the plurality of associated graphical display characteristics of the first candidate graphical display description to one or more of the plurality of associated graphical display characteristics of the second candidate graphical display description.

24. The method of claim 14, wherein the plurality of associated graphical display characteristics of a candidate graphical display description includes one or more of positional information, a number of products displayed, an arrangement of products displayed, an image associated with a product, a size of an image associated with a product, a title associated with a product, a size of a title associated with a product, a description associated with a product, a size of a description associated with a product, a price associated with a product, a size of a price associated with a product, a promotional offer, a size of a promotional offer, a call to action, a size of a call to action, an availability associated with a product, and a size of an availability of a product.

25. The method of claim 14, wherein generating, by the server computing device, the plurality of display description scores, each display description score of the plurality of display description scores associated with a candidate graphical display description of the plurality of candidate graphical display descriptions comprises:
generating, by the computer, the display description score for a candidate graphical display description based on one or more of a predicted probability of interaction by a user with a computerized graphical advertisement display conforming to the candidate graphical display description, an expected sales amount associated with the candidate graphical display description; and an expected value associated with the candidate graphical display description.

26. The method of claim 25, wherein the interaction by a user with the computerized graphical advertisement display conforming to the candidate graphical display description is a click on the computerized graphical advertisement display conforming to the candidate graphical display description.

27. The method of claim 14, wherein generating, by the server computing device, the plurality of display description scores, each display description score of the plurality of display description scores associated with a candidate graphical display description of the plurality of candidate graphical display descriptions comprises:
   generating, by the server computing device, the score for a candidate graphical display description based on one or more of a display context for the computerized graphical display, historical performance data for one or more of the plurality of associated graphical display characteristics of the candidate graphical display description, behavioral data for a user associated with the user device, one or more recommended products for display in the computerized graphical display, a temporal context for the computerized graphical display, and a geographical context for the computerized graphical display.

28. The method of claim 14, wherein selecting, by the server computing device, the selected graphical display descriptions from the plurality of candidate graphical display descriptions based on the plurality of display description scores comprises:
   selecting, by the server computing device, a candidate graphical display description from the plurality of candidate graphical display descriptions having a highest display description score of the plurality of display description scores.

29. The method of claim 14, wherein selecting, by the server computing device, the selected graphical display description from the plurality of candidate graphical display descriptions based on the plurality of display description scores comprises:
   selecting, by the server computing device, a candidate graphical display description from the plurality of candidate graphical display descriptions having a display description score lower than a highest display description score of the plurality of display description scores.

30. The method of claim 14, wherein selecting, by the server computing device, the selected graphical display descriptions from the plurality of candidate graphical display descriptions based on the plurality of display description scores comprises:
   selecting, by the server computing device, a candidate graphical display description from the plurality of candidate graphical display descriptions based on sampling a subset of the plurality of candidate graphical display descriptions, wherein the subset is determined based on the plurality of display description scores.

31. The method of claim 14, further comprising:
   altering, by the server computing device, one or more graphical display characteristics of the selected graphical display descriptions, wherein the one or more graphical display characteristics are position-independent, based on one or more of a display context for the computerized graphical display, historical performance data for the selected graphical display description, behavioral data for a user associated with the user device, one or more recommended products for display in the computerized graphical display, a temporal context for the computerized graphical display, and a geographical context for the computerized graphical display.

32. The method of claim 14, wherein retrieving, by the server computing device, the one or more seed layout descriptions comprises:
   selecting, by the server computing device, the one or more seed layout descriptions based on the one or more display capabilities of the user device.

33. The method of claim 14, further comprising:
   selecting, by the server computing device, a second selected graphical display description from the plurality of candidate graphical display descriptions based on the plurality of display description scores;
   generating, by the server computing device, second graphical display source code based on a candidate layout description used to generate the second selected graphical layout description, the size of the computerized graphical advertisement display, and the one or more display capabilities of the user device; and
   providing, by the server computing device, to the user device, the second graphical display source code.

34. The method of claim 33, further comprising:
   selecting, by the user device, selected graphical display source from the graphical display source code and the second graphical display source code based on a state of the user device; and
   rendering, by the user device, the selected graphical display source code to display the computerized graphical advertisement display.

35. A computer-implemented method of generating graphical display data for a computerized graphical advertisement display, the method comprising:
   receiving, by a server computing device, from a user device, a request for the graphical display data for the computerized graphical advertisement display;
   retrieving, by the server computing device, one or more seed layout descriptions, each seed layout description of the one or more seed layout descriptions specifying a plurality of associated constrained layout characteristics;
   generating, by the server computing device, a first plurality of candidate layout descriptions based on at least the one or more seed layout descriptions, each candidate layout description of the first plurality of candidate layout descriptions specifying a plurality of associated constrained layout characteristics, wherein one or more candidate layout descriptions of the first plurality of candidate layout descriptions are generated by the computer altering one or more of the plurality of associated constrained layout characteristics of a seed layout description of the one or more seed layout descriptions;
   generating, by the server computing device, a layout score for each of the first plurality of candidate layout descriptions;
   excluding, by the server computing device, one or more of the first plurality of candidate layout descriptions by sampling a subset of the first plurality of candidate layout descriptions based on the associated layout scores and excluding one or more of the sampled subset of the first plurality of candidate layout descriptions based on a number assigned to each candidate layout description in the sampled subset of the first plurality of candidate layout descriptions by a random number generator;
   generating, by the server computing device, a second plurality of candidate layout descriptions based on the first plurality of candidate layout descriptions, each candidate layout description of the second plurality of candidate layout descriptions specifying a plurality of associated constrained layout characteristics, wherein one or more candidate layout descriptions of the second plurality of candidate layout descriptions are generated by the computer altering one or more of the plurality of associated constrained layout characteristics of a candidate layout description of the first plurality of candidate layout descriptions;

generating, by the server computing device, a layout score for each of the second plurality of candidate layout descriptions;

excluding, by the server computing device, one or more of the second plurality of candidate layout descriptions by sampling a subset of the second plurality of candidate layout descriptions based on the associated layout scores and excluding one or more of the sampled subset of the second plurality of candidate layout descriptions based on a number assigned to each candidate layout description in the sampled subset of the second plurality of candidate layout descriptions by a random number generator;

generating, by the server computing device, a plurality of candidate graphical display descriptions based on one of: the first plurality of candidate layout descriptions or the second plurality of candidate layout descriptions, each candidate graphical display description of the plurality of candidate graphical display descriptions specifying a plurality of associated graphical display characteristics, wherein each candidate graphical display description of the plurality of candidate graphical display descriptions is generated based on a candidate layout description of the first plurality of candidate layout descriptions and/or a candidate layout description of the second plurality of candidate layout descriptions and a size of the computerized graphical advertisement display;

generating, by the server computing device, a plurality of display description scores, each display description score of the plurality of display description scores associated with a candidate graphical display description of the plurality of candidate graphical display descriptions;

selecting, by the server computing device, a selected graphical display descriptions from the plurality of candidate graphical display descriptions based on the plurality of display description scores;

generating, by the server computing device, the graphical display data based on the candidate layout descriptions used to generate each of the plurality of selected graphical layout descriptions and one or more display capabilities of the user device; and providing, by the server computing device, to the user device, the graphical display data to the user device.

36. The method of claim 35, wherein the graphical display data is image data or video data.

* * * * *